(12) United States Patent
Bruno et al.

(10) Patent No.: US 10,731,501 B2
(45) Date of Patent: Aug. 4, 2020

(54) ENVIRONMENTAL CONTROL SYSTEM UTILIZING A MOTOR ASSIST AND AN ENHANCED COMPRESSOR

(71) Applicant: Hamilton Sundstrand Corporation, Windsor Locks, CT (US)

(72) Inventors: Louis J. Bruno, Ellington, CT (US); Harold W. Hipsky, Willington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 549 days.

(21) Appl. No.: 15/136,210

(22) Filed: Apr. 22, 2016

(65) Prior Publication Data

US 2017/0306786 A1    Oct. 26, 2017

(51) Int. Cl.

| | | |
|---|---|---|
| *F01D 13/02* | (2006.01) | |
| *B64D 13/06* | (2006.01) | |
| *F04D 25/04* | (2006.01) | |
| *F04D 25/06* | (2006.01) | |
| *F04D 29/46* | (2006.01) | |
| *F02C 7/36* | (2006.01) | |
| *F02C 9/18* | (2006.01) | |
| *F04D 25/08* | (2006.01) | |

(52) U.S. Cl.
CPC ............ *F01D 13/02* (2013.01); *B64D 13/06* (2013.01); *F02C 7/36* (2013.01); *F02C 9/18* (2013.01); *F04D 25/04* (2013.01); *F04D 25/06* (2013.01); *F04D 29/462* (2013.01); *B64D 2013/0644* (2013.01); *F04D 25/08* (2013.01); *F05D 2220/50* (2013.01)

(58) Field of Classification Search
CPC .... F01D 13/02; F02C 9/18; F02C 7/36; F04D 25/06; F04D 25/04; F04D 29/462; F04D 2220/50; F04D 25/08; B64D 13/06
See application file for complete search history.

(56) References Cited

U.S. PATENT DOCUMENTS 4,419,926 A * 12/1983 Cronin .................. B64D 13/06
237/11
4,754,607 A * 7/1988 Mackay .................... F02C 6/18
237/12.1

(Continued)

FOREIGN PATENT DOCUMENTS

EP    2845804 A1    3/2015

OTHER PUBLICATIONS

Search Report dated Sep. 1, 2017, EP Application No. 17167318, 9 pages.

*Primary Examiner* — Ljiljana V. Ciric
(74) *Attorney, Agent, or Firm* — Cantor Colburn LLP (57) ABSTRACT

A system includes a first inlet providing a medium from a source and a compressing device arranged in communication with the first inlet. The compressing device includes a compressor configured to receive the medium and a turbine located downstream from the compressor. The system additionally includes at least one heat exchanger and an electric motor operably coupled to the compressor. The system is powered by mechanical power from the medium and by electrical power from the electric motor. The input power of the electric motor is less than or equal to 0.5 kilowatts per pounds per minute of medium compressed.

15 Claims, 6 Drawing Sheets

(56) References Cited

U.S. PATENT DOCUMENTS

| | | | | |
|---|---|---|---|---|
| 4,821,506 A * | 4/1989 | Rodgers | | F01D 17/162 415/160 |
| 4,981,018 A | 1/1991 | Jones et al. | | |
| 5,497,615 A * | 3/1996 | Noe | | F02C 6/20 60/39.511 |
| 5,709,103 A | 1/1998 | Williams | | |
| 5,799,484 A * | 9/1998 | Nims | | F01D 15/10 290/4 D |
| 5,845,479 A * | 12/1998 | Nakhamkin | | F02C 6/16 60/777 |
| 6,031,294 A * | 2/2000 | Geis | | F02C 9/56 290/40 R |
| 6,105,697 A * | 8/2000 | Weaver | | B60H 1/18 180/65.245 |
| 6,169,332 B1 * | 1/2001 | Taylor | | F01D 15/10 290/7 |
| 6,427,471 B1 | 8/2002 | Ando et al. | | |
| 6,526,757 B2 * | 3/2003 | Mackay | | F02C 1/06 60/39.41 |
| 6,526,775 B1 * | 3/2003 | Asfia | | B64D 13/06 62/402 |
| 6,606,864 B2 * | 8/2003 | MacKay | | F02C 1/06 60/39.41 |
| 6,704,625 B2 | 3/2004 | Albero et al. | | |
| 7,322,202 B2 | 1/2008 | Zywiak et al. | | |
| 7,578,136 B2 | 8/2009 | Derouineau et al. | | |
| 7,950,606 B2 | 5/2011 | Atkey et al. | | |
| 7,970,497 B2 | 6/2011 | Derouineau et al. | | |
| 8,631,657 B2 * | 1/2014 | Hagen | | B60H 1/032 237/12.1 |
| 8,957,539 B1 * | 2/2015 | Ralston | | F01D 15/10 290/52 |
| 8,973,393 B2 | 3/2015 | Atkey et al. | | |
| 9,016,075 B1 * | 4/2015 | Johnson | | F25B 9/06 62/115 |
| 9,205,925 B2 | 12/2015 | Bruno et al. | | |
| 9,205,927 B2 | 12/2015 | Shepard et al. | | |
| 9,482,156 B2 * | 11/2016 | Nordstrom | | F02C 7/10 |
| 9,534,538 B1 * | 1/2017 | Cerny | | F02C 7/268 |
| 9,669,936 B1 * | 6/2017 | Fiterman | | B64D 13/06 |
| 9,764,848 B1 * | 9/2017 | Vondrell | | B64D 27/18 |
| 9,938,853 B2 * | 4/2018 | Gemin | | F01D 15/10 |
| 10,000,293 B2 * | 6/2018 | Hamel | | B64D 27/18 |
| 10,071,811 B2 * | 9/2018 | Kupiszewski | | F02C 7/16 |
| 10,093,428 B2 * | 10/2018 | Kupiszewski | | B64D 27/24 |
| 10,597,162 B2 * | 3/2020 | Bruno | | F01D 5/06 |
| 2007/0125082 A1 * | 6/2007 | Sumser | | F02B 37/025 60/599 |
| 2007/0193301 A1 * | 8/2007 | Andres | | B64D 13/06 62/498 |
| 2007/0266695 A1 * | 11/2007 | Lui | | B64D 13/06 60/204 |
| 2007/0271952 A1 * | 11/2007 | Lui | | B64D 13/06 62/402 |
| 2007/0271956 A1 * | 11/2007 | Smith | | F25B 11/04 62/505 |
| 2008/0264084 A1 | 10/2008 | Derouineau et al. | | |
| 2009/0179424 A1 * | 7/2009 | Yaron | | B60K 6/24 290/52 |
| 2009/0211273 A1 * | 8/2009 | Klewer | | B64D 13/06 62/89 |
| 2010/0006264 A1 * | 1/2010 | Jadric | | F25B 31/008 165/104.19 |
| 2010/0170262 A1 | 7/2010 | Kaslusky et al. | | |
| 2011/0197849 A1 * | 8/2011 | Wright | | F01C 1/22 123/241 |
| 2011/0262269 A1 * | 10/2011 | Lior | | F01D 17/10 415/180 |
| 2012/0000204 A1 * | 1/2012 | Kesseli | | F02C 3/107 60/778 |
| 2012/0000205 A1 * | 1/2012 | Coffinberry | | B64D 13/06 60/806 |
| 2012/0023959 A1 * | 2/2012 | Snook | | F02C 3/34 60/772 |
| 2012/0023966 A1 * | 2/2012 | Ouellet | | F02C 3/36 60/778 |
| 2012/0114463 A1 | 5/2012 | Beers et al. | | |
| 2012/0131950 A1 * | 5/2012 | Kolscheid | | F25J 1/0285 62/613 |
| 2012/0291426 A1 * | 11/2012 | Loison | | B64D 13/06 60/327 |
| 2013/0067945 A1 * | 3/2013 | Kelnhofer | | B64D 13/06 62/186 |
| 2013/0139515 A1 * | 6/2013 | Schlak | | F02C 3/00 60/772 |
| 2013/0219893 A1 * | 8/2013 | Davey | | F25J 1/0281 60/670 |
| 2014/0123620 A1 * | 5/2014 | Huntington | | B01D 53/265 60/39.52 |
| 2014/0314590 A1 | 10/2014 | Ising | | |
| 2015/0065025 A1 * | 3/2015 | Bruno | | F02C 7/185 454/74 |
| 2015/0307196 A1 * | 10/2015 | Bruno | | F02C 6/08 62/61 |
| 2016/0105078 A1 * | 4/2016 | Santini | | F02C 7/36 290/52 |
| 2016/0109179 A1 * | 4/2016 | McCarthy | | F25J 1/0284 62/613 |
| 2016/0231031 A1 * | 8/2016 | Bruno | | B64D 13/06 |
| 2016/0273404 A1 * | 9/2016 | Ekanayake | | F01K 23/10 |
| 2016/0311538 A1 * | 10/2016 | Bruno | | B64D 13/06 |
| 2016/0311539 A1 * | 10/2016 | Bruno | | B64D 13/06 |
| 2016/0312648 A1 * | 10/2016 | Bruno | | F01D 17/105 |
| 2016/0332736 A1 * | 11/2016 | Parmentier | | B64D 13/08 |
| 2016/0355267 A1 * | 12/2016 | Bruno | | B64D 13/06 |
| 2016/0355268 A1 * | 12/2016 | Bruno | | B64D 13/06 |
| 2016/0355270 A1 * | 12/2016 | Bruno | | B64D 13/06 |
| 2017/0009774 A1 * | 1/2017 | Calafell | | F04D 25/04 |
| 2017/0074171 A1 * | 3/2017 | Takenaka | | F02C 7/224 |
| 2017/0234235 A1 * | 8/2017 | Pech | | F02C 7/27 290/31 |
| 2017/0254219 A1 * | 9/2017 | Suciu | | F01D 25/08 |
| 2017/0260872 A1 * | 9/2017 | Munevar | | B64D 27/10 |
| 2017/0268423 A1 * | 9/2017 | Schwarz | | F02C 9/18 |
| 2017/0284307 A1 * | 10/2017 | Inoue | | F01D 11/24 |
| 2017/0284408 A1 * | 10/2017 | Ricordeau | | F04D 25/06 |
| 2017/0305559 A1 * | 10/2017 | Bruno | | B64D 13/06 |
| 2017/0305560 A1 * | 10/2017 | Bruno | | B64D 13/06 |
| 2017/0335756 A1 * | 11/2017 | Donkin | | F02B 37/10 |
| 2017/0341758 A1 * | 11/2017 | Bruno | | B64D 13/06 |
| 2017/0341759 A1 * | 11/2017 | Bruno | | B64D 13/06 |
| 2017/0341760 A1 * | 11/2017 | Hall | | B64D 13/06 |
| 2017/0341761 A1 * | 11/2017 | Bruno | | B64D 13/04 |
| 2017/0341765 A1 * | 11/2017 | Bruno | | B64D 13/02 |
| 2017/0341767 A1 * | 11/2017 | Bruno | | B64D 13/02 |
| 2017/0341768 A1 * | 11/2017 | Bruno | | B64D 13/06 |
| 2018/0051584 A1 * | 2/2018 | Malkamaki | | F02C 6/00 |
| 2018/0266329 A1 * | 9/2018 | Mackin | | F02C 7/36 |
| 2018/0297709 A1 * | 10/2018 | Bruno | | B64D 13/02 |
| 2018/0306109 A1 * | 10/2018 | Marcucci | | F25J 1/0287 |
| 2019/0323427 A1 * | 10/2019 | Mackin | | F02C 3/04 |

* cited by examiner

ENVIRONMENTAL CONTROL SYSTEM UTILIZING A MOTOR ASSIST AND AN ENHANCED COMPRESSOR

BACKGROUND

In general, with respect to present air conditioning systems of aircraft, cabin pressurization and cooling is powered by engine bleed pressures at cruise. For example, pressurized air from an engine of the aircraft is provided to a cabin through a series of systems that alter the temperatures and pressures of the pressurized air. To power this preparation of the pressurized air, the only source of energy is the pressure of the air itself. As a result, the present air conditioning systems have always required relatively high pressures at cruise. Unfortunately, in view of an overarching trend in the aerospace industry towards more efficient aircraft, the relatively high pressures provide limited efficiency with respect to engine fuel burn.

SUMMARY

According to one embodiment, a system is provided. The system includes a first inlet providing a medium from a source; a compressing device in communication with the first inlet; and at least one heat exchanger. The compressing device includes a compressor that receives the medium and a turbine downstream of the compressor. The system is powered by mechanical power from the medium and by electrical power through a motor. The motor input power is less than or equal to 0.5 kilowatt per pounds per minute of the medium compressed.

Additional features and advantages are realized through the techniques of the embodiments herein. Other embodiments and aspects thereof are described in detail herein and are considered a part of the claims. For a better understanding of the embodiments with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the FIGS.

Embodiments herein provide an environmental control system that utilizes bleed pressures to power the environmental control system and to provide cabin pressurization and cooling at a high engine fuel burn efficiency, along with including a motor to assist with compression operations of the environmental control system.

Figure 1:
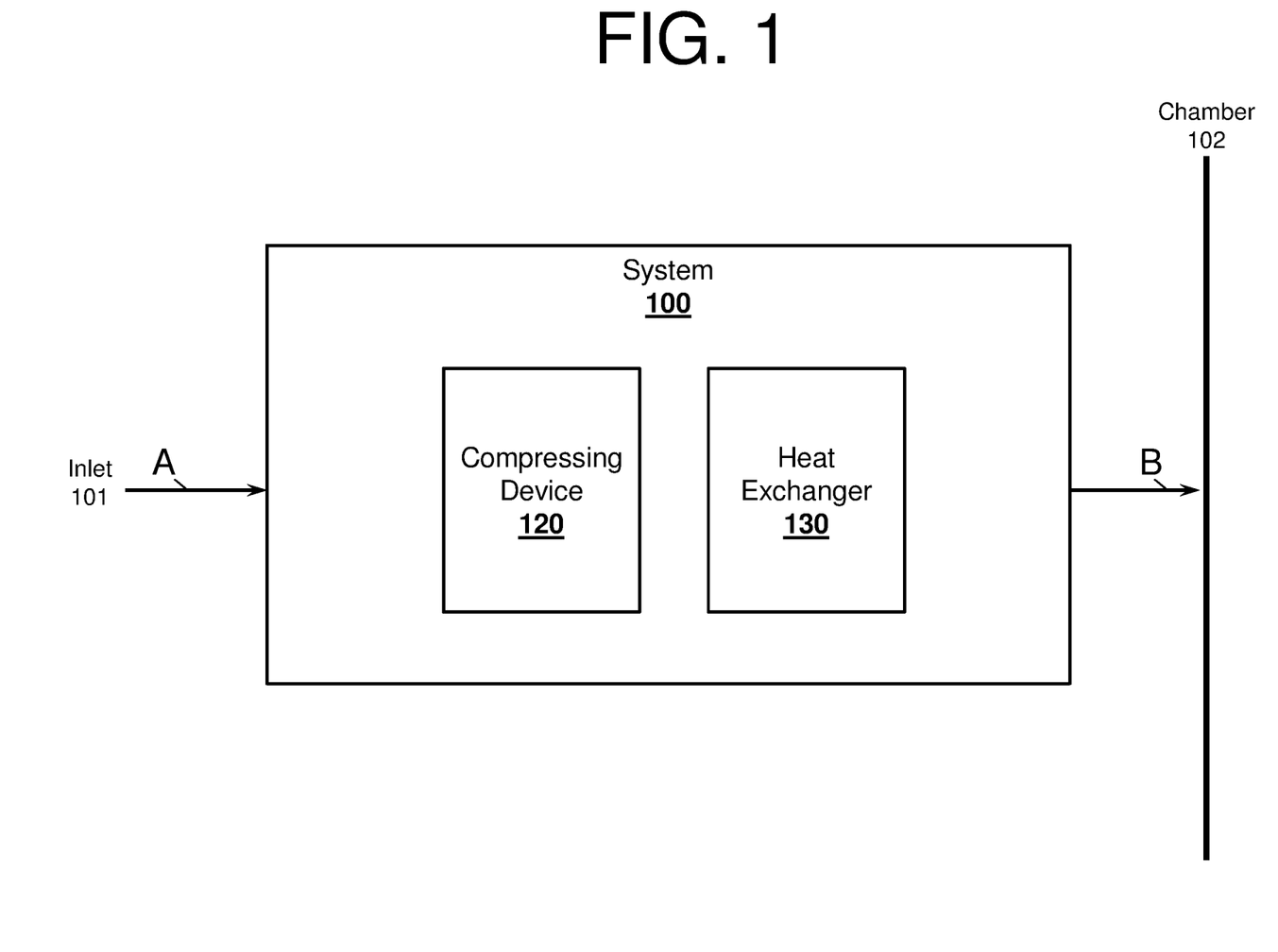
FIG. 1 is a diagram of an schematic of an environmental control system according to an embodiment.

In general, embodiments of the environmental control system may include one or more heat exchangers and a compressing device. A medium, bled from a low-pressure location of an engine, flows through the one or more heat exchangers into a chamber. Turning now to FIG. 1, a system 100 that receives a medium from an inlet 101 and provides a conditioned form of the medium to a chamber 102 is illustrated. The system 100 comprises a compressing device 120 and a heat exchanger 130. The elements of the system are connected via valves, tubes, pipes, and the like. Valves are devices that regulate, direct, and/or control a flow of a medium by opening, closing, or partially obstructing various passageways within the tubes, pipes, etc. of the system 100. Valves can be operated by actuators, such that flow rates of the medium in any portion of the system 100 can be regulated to a desired value.

As shown in FIG. 1, a medium can flow from an inlet 101 through the system 100 to a chamber 102, as indicated by solid-lined arrows A, B. In the system 100, the medium can flow through the compressing device 120, through the heat exchanger 130, from the compressing device 120 to the heat exchanger 130, from the heat exchanger 130 to the compressing device 120, etc.

The medium, in general, can be air, while other examples include gases, liquids, fluidized solids, or slurries. When the medium is being provided by an engine connected to the system 100, such as from the inlet 101, the medium can be referred to herein as bleed air. With respect to bleed air, a low-pressure location of the engine (or an auxiliary power unit) can be utilized to provide the medium at an initial pressure level near a pressure of the medium once it is in the chamber 102 (e.g., chamber pressure).

For instance, continuing with the aircraft example above, air can be supplied to the environmental control system by being "bled" from a compressor stage of a turbine engine. The temperature, humidity, and pressure of this bleed air varies widely depending upon a compressor stage and a revolutions per minute of the turbine engine. Since a low-pressure location of the engine is utilized, the medium may be slightly above or slightly below the pressure in the chamber 102. Bleeding the medium at such a low pressure from the low-pressure location causes less of a fuel burn than bleeding air from a higher pressure location. Yet, because the medium is starting at this relatively low initial pressure level and because a drop in pressure occurs over the one or more heat exchangers, the medium may drop below the chamber pressure while the medium is flowing through the heat exchanger 130. When the pressure of the medium is below the chamber pressure, the medium will not flow into the chamber to provide pressurization and temperature conditioning.

To achieve the desired pressure, the bleed-air can be compressed as it is passed through the compressing device 120. The compressing device 120 is a mechanical device that controls and manipulates the medium (e.g., increasing the pressure of bleed air). Examples of a compressing device 120 include an air cycle machine, a three-wheel machine, a four wheel-machine, etc. The compressing can include a compressor, such as a centrifugal, a diagonal or mixed-flow, axial-flow, reciprocating, ionic liquid piston, rotary screw, rotary vane, scroll, diaphragm, air bubble compressors, etc.

Further, compressors can be driven by a motor or the medium (e.g., bleed air, chamber discharge air, and/or recirculation air) via a turbine.

The heat exchanger 130 is a device built for efficient heat transfer from one medium to another. Examples of heat exchangers include double pipe, shell and tube, plate, plate and shell, adiabatic wheel, plate fin, pillow plate, and fluid heat exchangers. In an embodiment, air forced by a fan (e.g., via push or pull methods) can be blown across the heat exchanger at a variable cooling airflow to control a final air temperature of the bleed air.

Figure 2:
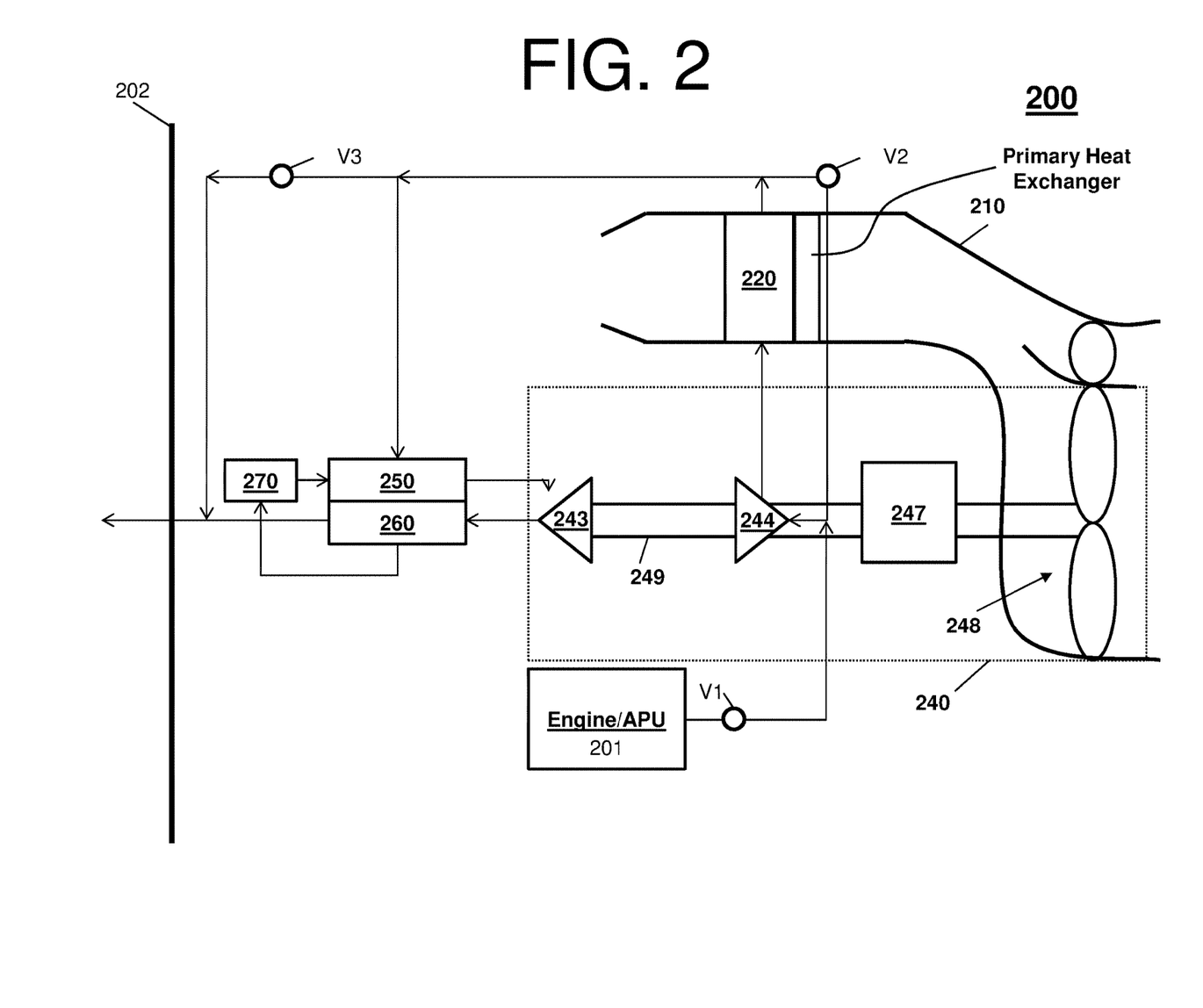
FIG. 2 is operation example of an environmental control system according to an embodiment.

The system 100 of FIG. 1 will now be described with reference to FIG. 2, in view of the aircraft example. FIG. 2 depicts a schematic of a system 200 (e.g., an embodiment of system 100) with a motor assist as it could be installed on an aircraft. The system 200 is an example of an environmental control system of an aircraft that provides air supply, thermal control, and cabin pressurization for the crew and passengers of the aircraft. The system 200 can be driven by a medium, e.g., by receiving bleed air at a bleed pressure at approximately 40 psia on the ground and as low as 2 psia below cabin pressure at the compressor inlet at cruise.

The system 200 illustrates the bleed air flowing in at inlet 201 (e.g., off an engine of an aircraft or auxiliary power unit at an initial flow rate, pressure, temperature, and humidity), which in turn is provided to a chamber 202 (e.g., cabin, flight deck, etc.) at a final flow rate, pressure, temperature, and humidity. The system includes a shell 210 for receiving and directing ram air through the system 200. Note that based on the embodiment, an exhaust from the system 200 can be sent to an outlet (e.g., releases to ambient air through the shell 210). Note also that the system 200 is designed to work with bleed pressures near a pressure of the chamber 202 (e.g., cabin pressure or chamber pressure) during cruise.

The system 200 further illustrates valves V1-V3, at least one heat exchanger 220, an air cycle machine 240 (that includes a turbine 243, a compressor 244, a motor 247, a fan 248, and a shaft 249), a reheater 250, a condenser 260, and a water extractor 270, each of which is connected via tubes, pipes, and the like. Note that the at least one heat exchanger 220 is an example of the heat exchanger 130 as described above. Further, in an embodiment, the at least one heat exchanger can be a secondary heat exchanger downstream of a primary heat exchanger (not shown). Note also that the air cycle machine 240 is an example of the compressing device 120 as described above.

The air cycle machine 240 controls/regulates a temperature, a humidity, and a pressure of a medium (e.g., increasing the pressure of a bleed air). The turbine 243 is a mechanical device that drives the compressor 244 and the fan 248 via the shaft 249. The compressor 244 is a mechanical device that raises the pressure of the bleed-air received from the first heat exchanger.

The motor 247 is a mechanical/electrical device that can also drive the compressor 244 and the fan 248 via the shaft 249. The motor 247 can be mounted on an air cycle machine (or the air cycle machine includes an additional electrical motor driven compressor). Note that in a conventional environmental control system, an electrical motor can be used to boost the pressure when the bleed pressure entering the conventional environmental control system is less a cabin pressure (e.g., as much as 5 psi below the cabin pressure). The amount of power utilized by this electrical motor of the conventional environmental control system is significant, since the air entering the pressurization system can be as low as 5 psi below cabin pressure. In contrast to the electrical motor of the conventional environmental control system, the 247 motor is significantly lower in power. The motor 247 provides assistance as needed, due to the system 200 being configured to receive the medium at equal to or within 2.5 psi of the chamber pressure at an inlet of the compressor 240. In this way, the system 200 avoids the above noted power challenges, along with challenges pertaining to liquid cooling of high power motor drives not discussed herein, of the conventional environmental control system. Further, the system 200 can utilize an electrical sub-system at a constant or a variable frequency to power the motor 247.

The fan 248 is a mechanical device that can force via push or pull methods air through the shell 210 across the secondary heat exchanger 220 at a variable cooling airflow. Thus, the turbine 243, the compressor 244, and the fan 248 together illustrate, for example, that the air cycle machine 240 may operate as a three-wheel air cycle machine that utilizes air recirculated from the chamber 202.

The reheater 250 and the condenser 260 are particular types of heat exchanger. The water extractor 270 is a mechanical device that performs a process of taking water from any source, such as bleed-air, either temporarily or permanently. Together, reheater 250, the condenser 260, and/or the water extractor 270 can combine to be a high pressure water separator.

An operation of the system will now be described with respect to a high pressure mode. During the high pressure mode, high-pressure high-temperature air from the inlet 201 via the valve V1 enters the compressor 244 of the air cycle machine 240. The compressor 244 further pressurizes the air and in the process heats it. The air then enters the at least one exchanger 220, where it is cooled by ram air to approximately ambient temperature to produce cool high pressure air. This cool high pressure air enters the high pressure water separator, where the air goes through the reheater 250, where it is cooled; the condenser 260, where it is cooled by air from the turbine 243 of the air cycle machine 240; the water extractor 270, where the moisture in the air is removed; and the reheater 250, where the air is heated back to nearly the same temperature it started at when it entered the high pressure water separator. The warm high pressure and now dry air enters the turbine 243, where it is expanded and work extracted. The work from the turbine 243, drives both the compressor 244 and the fan 248 that is used to pull a ram air flow through the at least one exchanger 220. After leaving the turbine 243, the cold air, typically below freezing, cools the warm moist air in the condenser 260. After the air leaves the condenser 260, it is sent to condition the chamber 202.

The high pressure mode of operation can be used at flight conditions when engine pressure is adequate to drive the cycle or when a temperature of the chamber 202 demands it. For example, conditions, such as ground idle, taxi, take-off, climb, descent, and hold conditions would have the air cycle machine 240 operating in the high pressure mode. In addition, extreme temperature high altitude cruise conditions could result in the air cycle machine 240 operating in the high pressure mode.

Note that when operating in the high pressure mode, it is possible for the air leaving the compressor 244 to exceed an auto-ignition temperature of fuel (e.g., 400 F for steady state and 450 F for transient). In this situation, air from the outlet of the heat exchanger 220 is ducted by the valve V2 to the inlet of the compressor 244. This lowers inlet temperature of the air entering the inlet of the compressor 244 and now, as a result, the air leaving the compressor 244 is below the auto-ignition temperature of fuel.

An operation of the system will now be described with respect to a low pressure mode. During the low pressure mode, the air from the inlet 201 via the valve V1 enters the compressor 244. The compressor 244 further pressurizes the air and in the process heats it. The air then enters the at least one exchanger 220, where it is cooled by ram air to a temperature requested by the chamber 202. The air then goes directly into the chamber 202 via valve V3.

The low pressure mode can be used at flight conditions where the pressure of the bleed air entering the air cycle machine 240 is greater than approximately 1 psi above the chamber pressure and/or where the pressure of the bleed air entering the air cycle machine 240 is as low as 2.5 psi below the chamber pressure (e.g., conditions at cruise where altitudes are above 30,000 ft. and conditions at or near standard ambient day types). In this mode the compressor 244 would have a pressure ratio of approximately 1.4 to 1. The system 200 capitalizes on the low pressure ratio be enabling a power utilized by the motor 247 to be significantly deceased. For example, the system can utilize a motor that utilize 0.5 kilowatts per pound per minute of air compressed, which is less than half the power required by the conventional environmental control system. By utilizing the motor 247, the system 200 avoids a need for liquid cooling systems used to cool the high power electronics, such as the conventional electric motor.

In addition, the system 200 can further utilize an enhanced compressor as the compressor 244 to address compressor range concerns during operations of the system 200. That is, the system 200 implements a corrected flow range that exceeds a corrected range flow of a centrifugal compressor of the conventional environmental control system. For instance, embodiments herein provide an environmental control system that utilizes bleed pressures to power the environmental control system and to provide cabin pressurization and cooling at a high engine fuel burn efficiency, along with including the enhanced compressor that has high efficiency over a much wider corrected flow and pressure ratio range than the conventional centrifugal compressor. The enhanced compressor can include one or more of a compressor with high rotor backsweep, shroud bleed, and a low solidity diffuser; a variable vaned diffuser, and a mixed flow compressor. The enhanced compressor will now be described with respect to FIGS. 3-6.

Figure 3:
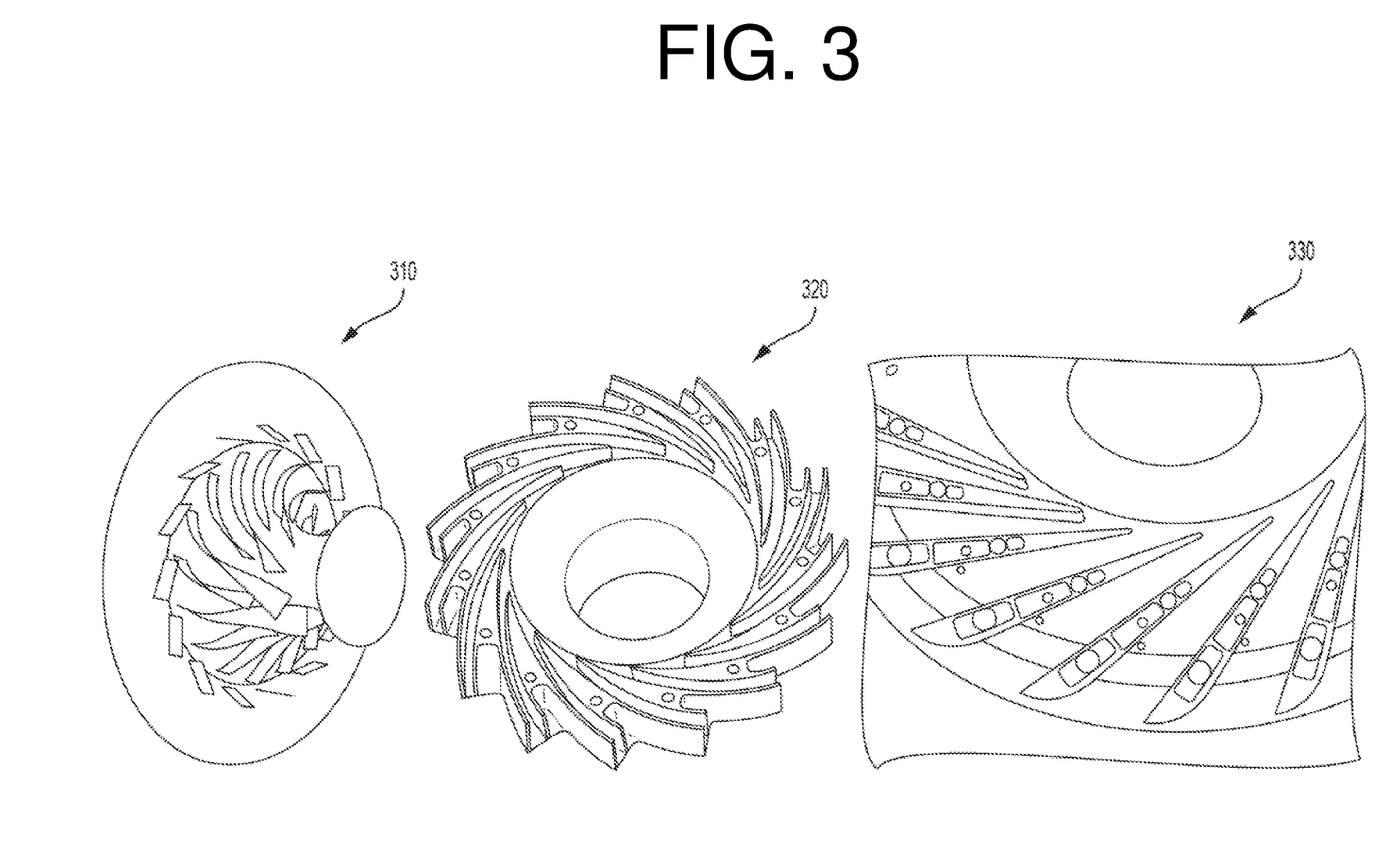
FIG. 3 is a diagram of schematics of diffusers of a compressing device according to an embodiment.

FIG. 3 is a diagram of schematics of diffusers of a compressing device according to an embodiment. FIG. 3 illustrates a plurality of diffusers, a schematic 310 of a low solidity diffuser, a schematic 320 of a curved channel diffusor, and a schematic 330 of a variable vaned diffuser. A diffuser converts the dynamic pressure of the medium flowing downstream of the rotor into static pressure rise by gradually slowing/diffusing a velocity of the medium (e.g., increases static pressure leaving the rotor). The diffuser can be vaneless, vaned or an alternating combination. As different diffuser types impact range and efficiency of the compressor 244 of the air cycle machine 240, one these diffusers 310, 320, and 330 can be utilized within the compressor 244 (e.g., at position 606 described below with respect to FIG. 6). The low solidity diffuser has a smaller number of vanes and provides a wide operating range with a lower efficiency. The curved channel diffuser extends arches each of the vanes and provides a narrow operating range with a high efficiency. The variable vaned diffuser comprises a plurality of vanes, each of which is configured to rotate about a pin as an articulating member moves the plurality of vanes, and provides a very high operating range with a high efficiency. Further, a single diffuser that has a combination of two or more of the diffusers 310, 320, and 330 can also be utilized.

Figure 4:
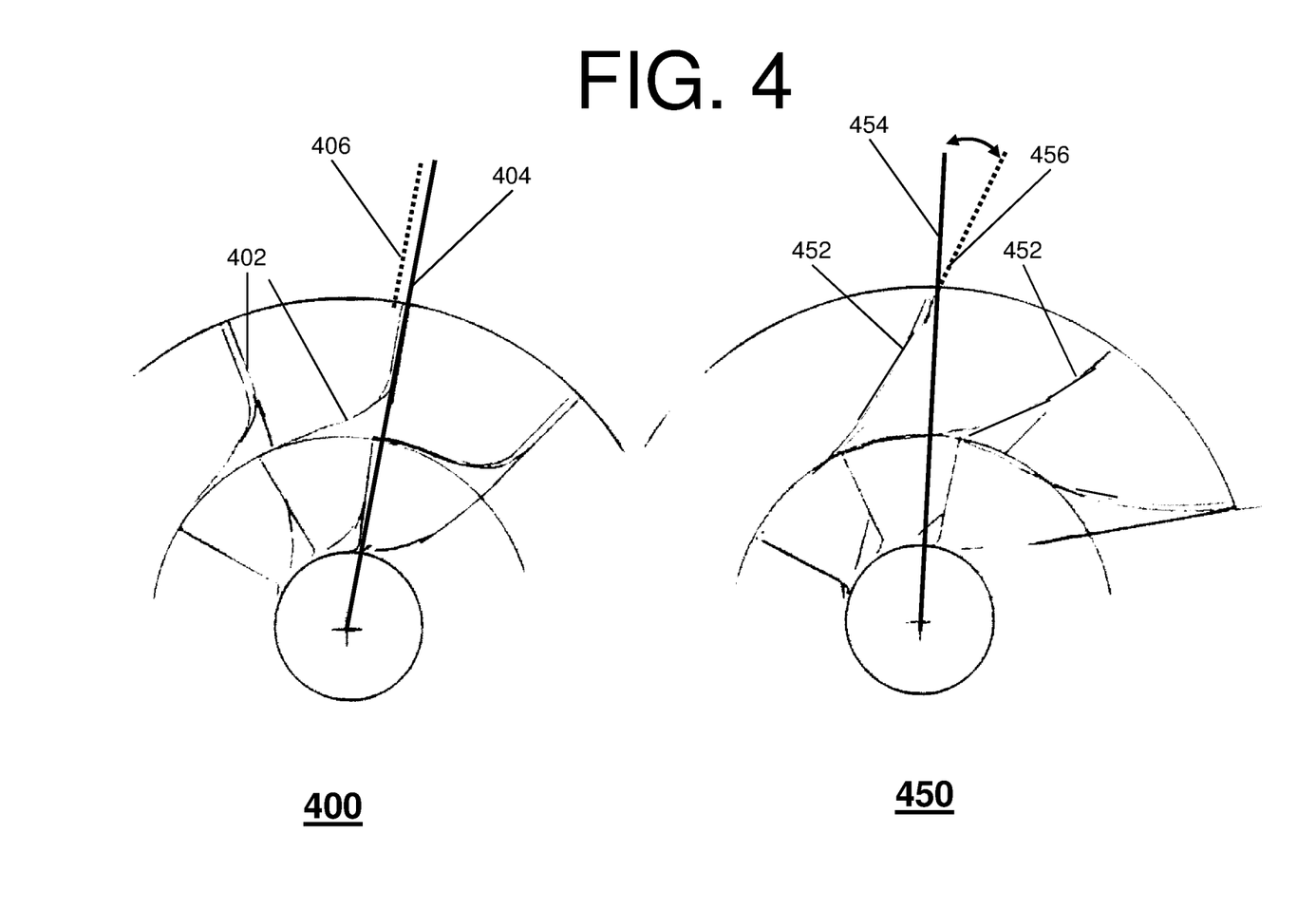
FIG. 4 is a diagram of schematics of compressor rotor backsweep according to an embodiment.
Figure 5:
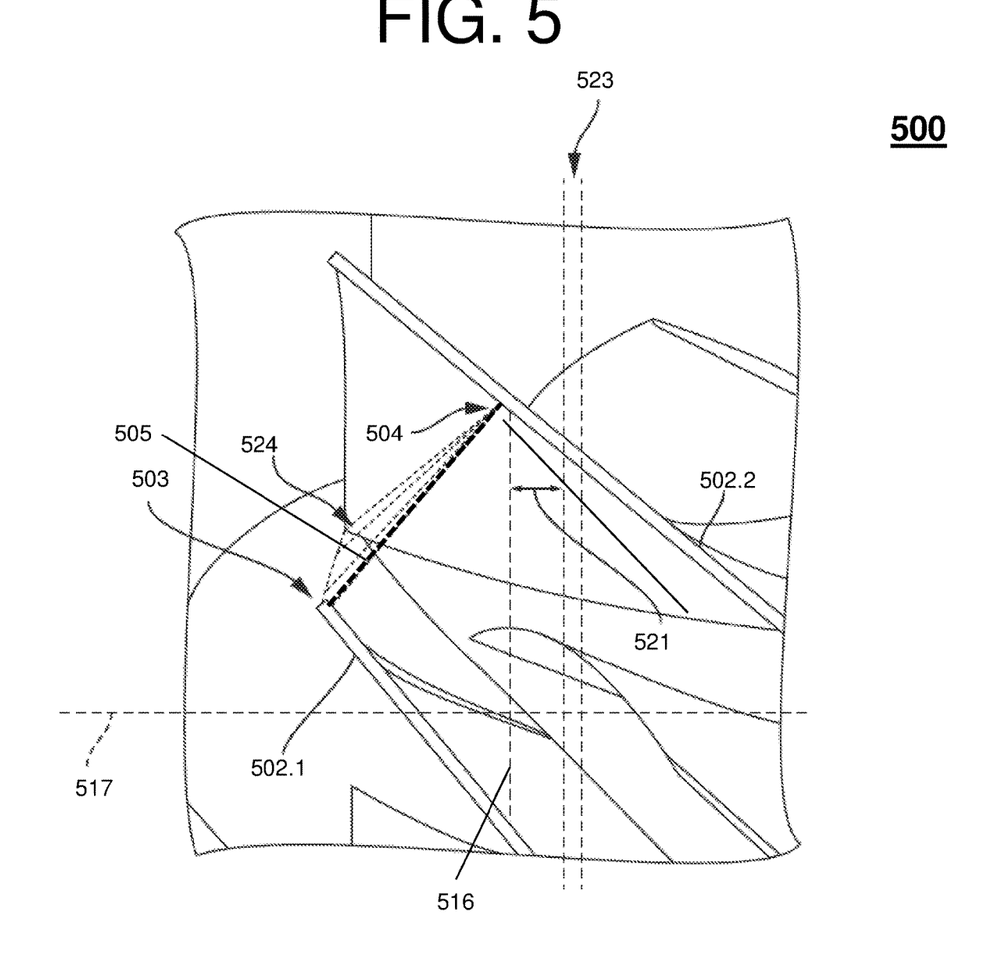
FIG. 5 illustrates a shroud bleed placement diagram according to an embodiment.

Turning now to FIGS. 4-5, the enhanced compressor will now be described with respect to the compressor 244 including a high rotor backsweep with shroud bleed and a low solidity diffuser.

FIG. 4 is a diagram of schematics of a compressor rotor backsweep according to an embodiment. FIG. 4 illustrates a first rotor 400, with a plurality of blades 402, according to an embodiment. As illustrated, a reference line 404 extends radially from a center of the rotor 400. A dotted-line 406 tracks a direction of the rotor blade 402, if the rotor blade 402 were to be extended from a circumferential edge of the rotor 400. As shown, the direction of the rotor blade 402 (e.g., dotted-line 406) is in parallel with the reference line 404, which indicates no rotor backsweep.

FIG. 4 also illustrates a high rotor backsweep 450, with a plurality of blades 452, according to an embodiment. As illustrated, a reference line 454 extends radially from a center of the rotor 450. A dotted-line 456 tracks a direction of the rotor blade 452, if the rotor blade 452 were to be extended from a circumferential edge of the rotor 450. As shown, the direction of the rotor blade 452 (e.g., dotted-line 456) is not in parallel with the reference line 454, which indicates a rotor backsweep. The backsweep can be predetermined during manufacturing of the rotor, and can range from 0° to 90°. Embodiments of the backsweep include, but are not limited to, 0°, 30°, 42°, 45°, and 52°.

FIG. 5 illustrates a shroud bleed placement diagram 500, which includes a plurality of demarcations and lines overlaying a greyed-out view of a portion of a rotor, according to an embodiment. As shown, rotor blades or impeller blades 502 (e.g., impeller blades 502.1 and 502.2) bound a flow path. From a shroud tip 503 of the impeller blade 502.1 (i.e., an impeller blade leading edge) to a shroud suction surface 504 of the impeller blade 502.2 a throat 505 of the flow path is formed. At a location where the throat 505 contacts the shroud suction surface 504 of the impeller blade 502.2, a plane 516 is formed. The plane 516 is perpendicular to an axis of rotation 517 of the rotor itself. The plane 516 can be utilized to offset 521 a shroud bleed 523. In an embodiment, the offset 521 can be selected from a range, such as a range from 0 to 0.90 inches.

The shroud bleed 523 can be an opening for allowing a portion of a medium in the flow path to bleed out of or into the flow path instead of exiting the rotor. The shroud bleed 523 can be a circumferentially located on a housing of the rotor. The shroud bleed 523 can comprise one or more openings, each of which can be segmented at fixed or varying intervals, lengths, and/or patterns, to accommodate different bleed rates. The shroud bleed 523 can be holes, slots, cuts, etc. The shroud bleed 523 can be defined by an area, such as a total open area that is a percentage, e.g., 0 to 50% of a total rotor inlet throat area 524. The total rotor inlet throat area 524 is defined by the area 524 between each pair of impeller blades 502.

Figure 6:
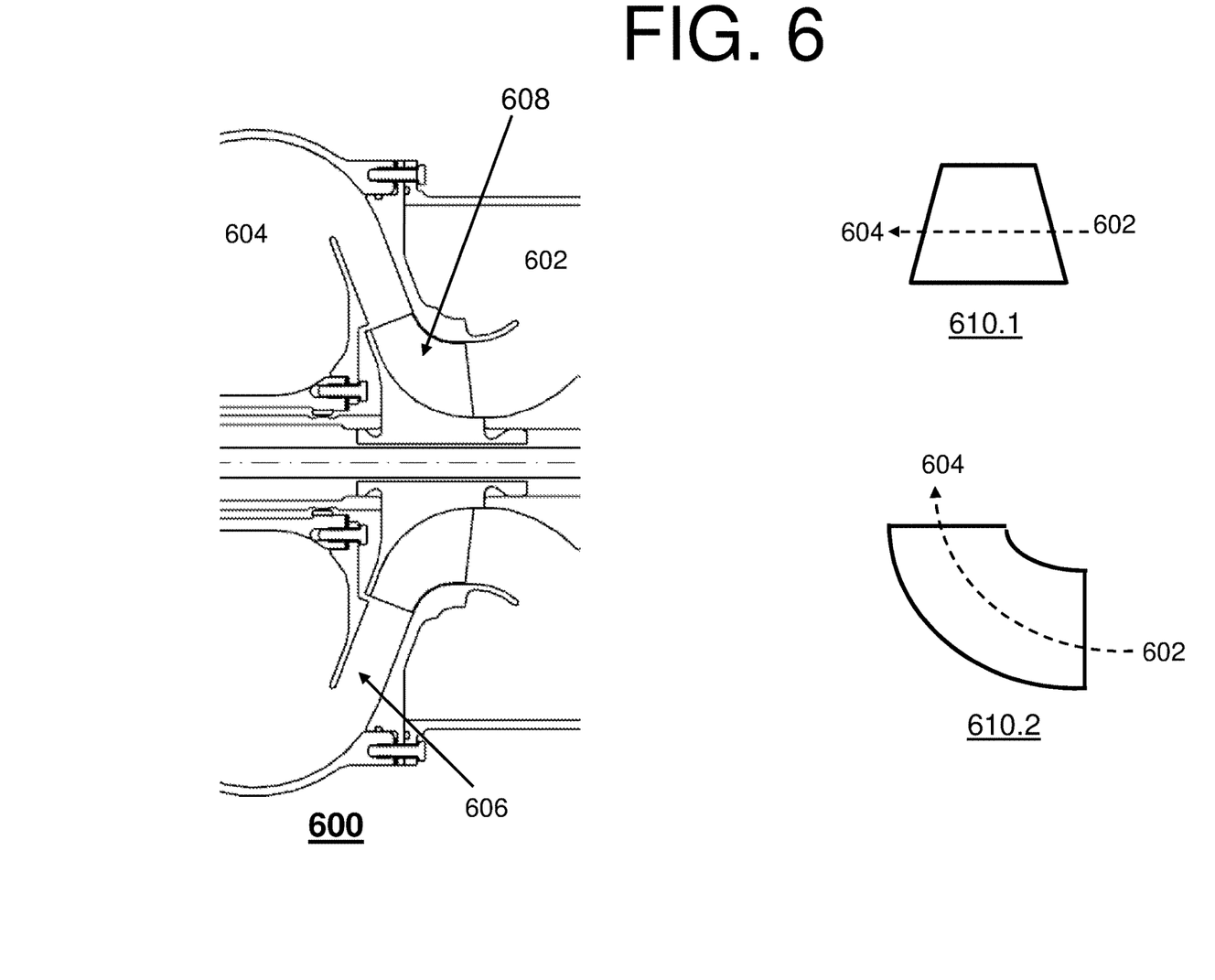
FIG. 6 is a diagram of schematics of a mixed flow channel according to an embodiment.

FIG. 6 is a diagram of schematics of a mixed flow channel according to an embodiment. FIG. 6 illustrates a cross section view 600 of the compressor 244. As shown in the cross section view 600, the compressor 244 comprises an inlet 602 and an outlet 604, which define a flow path. That is, the flow path between the inlet 602 and the outlet 604 is the mixed flow channel. The mixed flow channel can house a diffuser at position 606 and a rotor at position 608. A shape of the mixed flow channel can be selected to be between a range of a channel 610.1 to a channel 610.2. For instance, the channel 610.1 is a straight flow path, where a flow of a medium through the channel 610.1 is parallel to an axis of rotation of the rotor. Further, the channel 610.2 is a bent flow path, where the flow of the medium through the channel 610.2 begins at inlet 602 in parallel with the axis of rotation of the rotor and ends at outlet 604 perpendicular to the axis of rotation of the rotor.

In view of the above, embodiments herein can include a hybrid electric and bleed system for a vehicle or pressure vessel. The hybrid electric and bleed system can comprise an environmental control system having a pressurization circuit and a cooling circuit. The pressurization circuit provides air near cabin pressure. The cooling circuit rejects heat and water from air outside the pressure vessel. The environmental control system can be configured to be powered by mechanical power from pressurized bleed air and/or by electrical power through an electric motor. The environmental control system can include a compressor mechanically attached to a turbine, where the compressor has high rotor backsweep with shroud bleed and a low solidity diffuser, utilizes a variable vaned diffuser, and/or utilizes a mixed flow compressor.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. A system, comprising:
a first inlet for providing a medium from a source;
a compressing device in communication with the first inlet, wherein the compressing device comprises:
a compressor configured to receive the medium, and
a turbine downstream of the compressor;
at least one heat exchanger, and
an electric motor connected to the compressor via a shaft, the electric motor being operable to drive the compressor;
wherein the system is configured to be powered by mechanical power from the medium and by electrical power from the electric motor, and
wherein the electric motor has a motor input power of less than 0.5 kilowatts per pound per minute of medium compressed by the compressor.

2. The system of claim 1, comprising:
an electric system having at least one engine driven generator.

3. The system of claim 2, comprising:
an auxiliary power unit having a load compressor to start an engine or to drive the system.

4. The system of claim 1, wherein the compressor has a rotor backsweep between 0° and 90° with a shroud bleed and a low solidity diffuser.

5. The system of claim 1, wherein the compressing device comprises a diffuser on an exit path of a rotor of the compressor.

6. The system of claim 5, wherein the diffuser is a low solidity diffuser.

7. The system of claim 5, wherein the diffuser is a variable vaned diffuser.

8. The system of claim 5, wherein the diffuser is a curved channel diffuser.

9. The system of claim 1, wherein the compressor is a mixed flow compressor.

10. The system of claim 1, wherein the medium output from the system is configured to be delivered to a chamber and has a pressure equal to a pressure of the chamber.

11. The system of claim 1, wherein the system is a hybrid electric and bleed system.

12. The system of claim 1, wherein the at least one heat exchanger comprises a first heat exchanger and a second heat exchanger, and
wherein the second heat exchanger is down-stream of the compressor.

13. The system of claim 1, wherein the medium includes bleed air received by the system from an engine or an auxiliary power unit.

14. The system of claim 1, wherein the system is part of an environmental control system of an airplane.

15. A system, comprising:
a first inlet for providing a medium from a source;
a compressing device in communication with the first inlet, wherein the compressing device comprises:
a compressor configured to receive the medium, wherein the compressor has a rotor backsweep between 0° and 90° with a shroud bleed and a low solidity diffuser, and
a turbine downstream of the compressor;
at least one heat exchanger, and
an electric motor configured to operate the compressor;
wherein the system is configured to be powered by mechanical power from the medium and by electrical power from the electric motor, and
wherein the motor input power of the electric motor is less than 0.5 kilowatts per pound per minute of medium compressed.

* * * * *